United States Patent
Chan (10) Patent No.: US 6,769,123 B1
(45) Date of Patent: Jul. 27, 2004

(54) METHOD AND APPARATUS OF USING A SINGLE COMPUTER PROGRAM SOURCE CODE BASE TO PROVIDE A PROGRAM THAT IS OPERABLE IN EITHER A CLIENT-SERVER MODE OR A STANDALONE MODE

(75) Inventor: Chi-Choi Chan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 380 days.

(21) Appl. No.: 09/656,537

(22) Filed: Sep. 7, 2000

(51) Int. Cl.$^7$ .................................................. G06F 3/00
(52) U.S. Cl. ........................ 719/315; 709/201; 709/202; 709/203; 717/146; 717/147
(58) Field of Search ......................... 709/328, 201–203; 717/147, 146; 719/328, 315

(56) References Cited

U.S. PATENT DOCUMENTS

| | | | |
|---|---|---|---|
| 5,737,607 A | * | 4/1998 | Hamilton et al. ............ 709/316 |
| 5,928,323 A | * | 7/1999 | Gosling et al. ............. 709/203 |
| 6,006,230 A | * | 12/1999 | Ludwig et al. ............... 707/10 |
| 6,066,181 A | * | 5/2000 | DeMaster .................... 717/148 |
| 6,327,606 B1 | * | 12/2001 | Chidambaran .............. 709/104 |

\* cited by examiner

*Primary Examiner*—Meng-Al T. An
*Assistant Examiner*—Phuong Ngoc Hoang
(74) *Attorney, Agent, or Firm*—Hickman Palermo Truong & Becker LLP

(57) ABSTRACT

A method and apparatus for using a single computer program code base to provide a program that is operable in either a client-server mode or a standalone mode are provided. In one embodiment, a client logic element has one or more proxy objects, each of which implement an interface that is neutral with respect to the client-server mode and the standalone mode. A server logic element has one or more service objects. Each of the service objects implements the interface. The interface implementations are not bound to any code that is specific to the client-server version or the standalone version. In the stand-alone version, the client side logic invokes the server side logic directly through the interfaces, as implemented by the service objects. In the client-server version, the client side logic invokes the server side logic through the same set of Java interfaces. However, the interfaces are implemented by the proxy objects, which internally implement a transport mechanism to forward the method invocation and parameters to the server side through a servlet API. In response, a servlet identifies the corresponding service object and invokes the corresponding method with serialized parameters. When the method returns, the resulting object, which can be a new proxy object, is serialized back into the proxy object for the invocation and from there the result is returned to the client side logic. Using this mechanism, the client side logic only interacts with the Java interfaces, without the need to know whether it is dealing with service objects or proxy objects. Accordingly, the client side logic is shielded from any version-specific code. In addition, the same runtime environment can support both the client-server version and the standalone version.

19 Claims, 7 Drawing Sheets

FIG. 1
(PRIOR ART)

APPROACH OF CORBA OR REMOTE METHOD INVOCATION IN JAVA(R)

METHOD AND APPARATUS OF USING A SINGLE COMPUTER PROGRAM SOURCE CODE BASE TO PROVIDE A PROGRAM THAT IS OPERABLE IN EITHER A CLIENT-SERVER MODE OR A STANDALONE MODE

FIELD OF THE INVENTION

The present invention generally relates to data processing. The invention relates more specifically to methods and apparatus of using a single computer program code base to provide a program that is operable in either a client-server mode or a standalone mode.

BACKGROUND OF THE INVENTION

Development of a new computer software application program often requires an early and fundamental design decision, namely whether to structure the program as a stand-alone program or as a client-server application. Stand-alone programs normally support use by a single user who communicates with one instance of the program at any given time. Client-server applications generally comprise a server software element that can receive and support multiple connections from multiple concurrent users or client software elements. Client-server architecture is increasingly popular because it is naturally suited to technologies such as the World Wide Web, in which browser client programs receive service from a remotely located server. In client-server model the browser client may execute a client side applet that communicates with a server side program.

Stand-alone programs are more simple to develop and operate, but lack flexibility and scalability. Client-server applications offer the advantage of central control, and can use and build upon proven and standardized client technologies such as Web browsers. However, client-server applications are far more complicated to develop, deploy, and maintain. Further, the server element represents a single point of failure, which is undesirable in some systems. More information about client-server computing is disclosed in R. Orfali et al., "Client/Server Survival Guide" (New York: John Wiley & Sons, Inc.), 3d Ed. 1999.

Accordingly, some application programs are designed in both a standalone version and a client-server version. A challenge involved in the development of such programs is how to structure the computer program source code that makes up both versions (the "code base") in a way that both versions can be supported without unacceptably high development and maintenance costs.

In one approach to this problem, two (2) separate code bases are maintained, one for the standalone version of the application program and another for the client-server version. This approach requires different versions for some of the code as well as duplicating common code in each code base. When this approach is implemented in the Java® language, another drawback of this approach is that the two versions of executable code ("code images") cannot coexist in the same runtime tree, since they have the same package paths and class names. This would result in conflicts and errors in compilation, interpretation or execution. (Java® is a trademark of Sun Microsystems, Inc.)

In an alternative approach, one (1) code base is used, with two (2) versions of certain interfaces between client side logic and server side logic. At run time, a portion of the client code would determine whether the currently executing version is the stand-alone version or the client-server version. Based on such determination, a corresponding version of the interfaces is selected. A disadvantage of this approach is that the version specific code is mixed in the same physical files, and one final code image is produced for both versions. As a result, the mixed version specific code is difficult to maintain as the interfaces grow, and it is difficult to debug. The decision and selection process also introduces unnecessary overhead at runtime.

In yet another alternative approach, one (1) code base is used, and compiler condition directives are used to separate version-specific code at compile time. For example, the "cpp" compiler condition directive may be used to instruct the compiler to selectively compile portions of the source code depending on whether the stand-alone version or client-server version is being compiled. However, this approach requires the compiler directives to be placed in each file that has version-specific logic. This includes all the interface files between the client side logic and the server side logic. This also makes the code difficult to maintain. As in the first approach described above, when this approach is implemented in the Javag language, another drawback is that the two versions of code images cannot coexist in the same runtime tree, since they have the same package paths and class names. This would result in conflicts and errors in compilation, interpretation or execution.

Based on the foregoing, there is a clear need for a way to structure a code base in order to support both a stand-alone version of an application program and a client-server version.

Ideally, a single computer program code base could provide a program that is operable in either a client-server mode or a standalone mode.

There is a particular need for a method and approach that is useful in the Java® program development environment.

SUMMARY OF THE INVENTION

A method and apparatus for using a single computer program code base to provide a program that is operable in either a client-server mode or a standalone mode are provided. According to one aspect, the invention provides a method of operating a software application in either a client-server mode or a standalone mode using one software code base. Client logic and server logic are created and stored within the one software code base. One or more service objects are created that implement one or more interfaces among the client logic and the server logic. For each of the service objects, a corresponding proxy object is created and stored. A standalone version of the software application that includes the service objects is created and stored. In the standalone version, the client logic invokes the server logic through the interfaces, which are implemented by the service objects.

One feature of this aspect involves creating and storing a client-server version of the software application that includes the service objects and the proxy objects, in which the client logic invokes the server logic through the interfaces, which are implemented by the service objects. In another feature, the method further involves receiving an invocation of a server logic method from the client logic at one of the proxy objects; forwarding the method invocation to a servlet element; and identifying and invoking a corresponding method of one of the service objects that corresponds to one of the proxy objects.

According to another feature, the method includes the steps of serializing parameters of the invocation of the server logic as part of invoking the corresponding method. Another feature involves receiving a result of the service object invocation in the form of a second proxy object; serializing result parameters of the second proxy object into the first proxy object; returning results to the client logic via the proxy object.

In one specific embodiment, a client logic element has one or more proxy objects, each of which implement an interface that is neutral with respect to the client-server mode and the standalone mode. A server logic element has one or more service objects. Each of the service objects implements the interface. The interface implementations are not bound to any code that is specific to the client-server version or the standalone version. In the stand-alone version, the client side logic invokes the server side logic directly through the interfaces, as implemented by the service objects. In the client-server version, the client side logic invokes the server side logic through the same set of Java interfaces. However, the interfaces are implemented by the proxy objects, which internally implement a transport mechanism to forward the method invocation and parameters to the server side through a servlet API. In response, a servlet identifies the corresponding service object and invokes the corresponding method with serialized parameters. When the method returns, the resulting object, which can be a new proxy object, is serialized back into the proxy object for the invocation and from there the result is returned to the client side logic. Using this mechanism, the client side logic only interacts with the Java interfaces, without the need to know whether it is dealing with service objects or proxy objects. Accordingly, the client side logic is shielded from any version-specific code. In addition, the same runtime environment can support both the client-server version and the standalone version.

Other aspects and embodiments relate to a multi-mode network management application program, and to a computer-readable medium that is configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for using a single computer program code base to implement a multi-mode computing environment is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview of a First Embodiment, Including Java Interfaces And Proxy Objects

Figure 1:
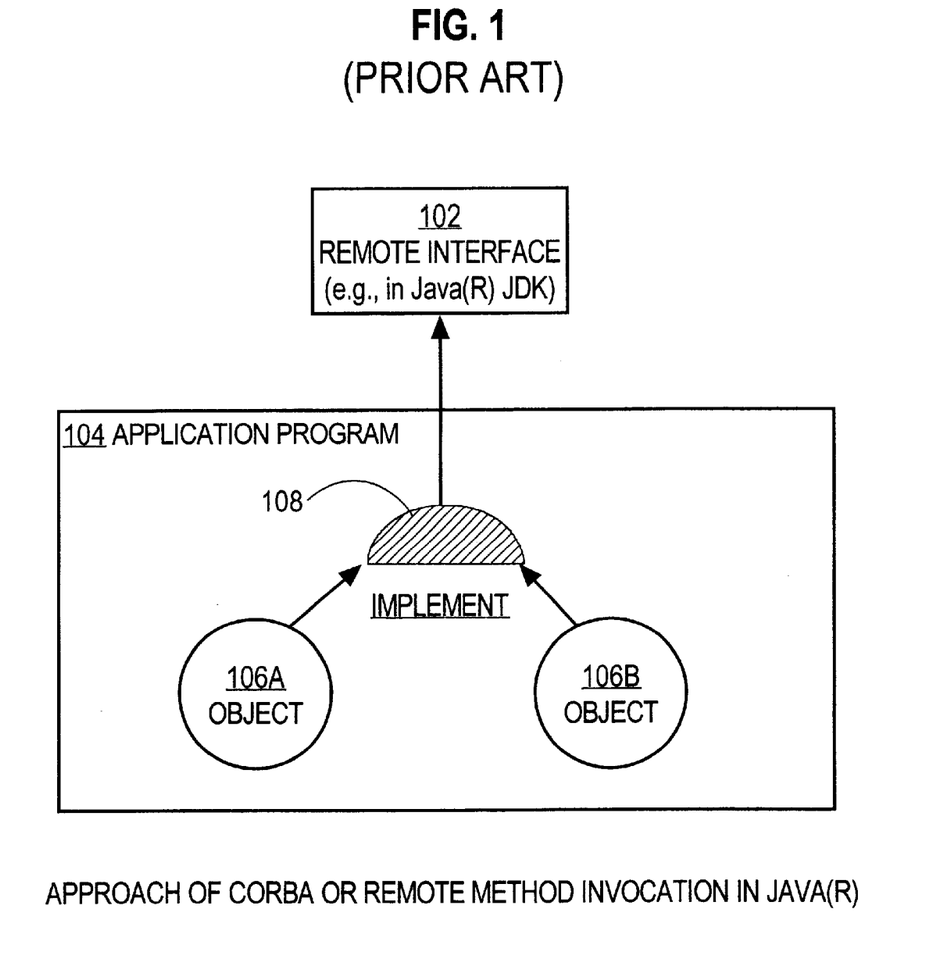
FIG. 1 is a block diagram of a prior art approach of implementing object interfaces using remote method invocation.

According to a first embodiment, Java interfaces, proxy objects and compiler condition directives are used to structure a single code base that can be used for both a standalone version and a client-server version of an application program. For purposes of illustrating the general context of the present invention, FIG. 1 is a block diagram of a prior art mechanism for invoking an interface method in an object-oriented program environment.

An application program 104, which is prepared in an object-oriented programming language such as Java, instantiates objects 106A, 106B. Each of the objects 106A, 106B implements an interface object 108. The interface object 108 uses Java Remote Method Invocation to invoke a remote interface method 102 that is located outside the application program 104. For example, remote interface method 102 could be located in one of the methods that forms the Java Development Kit that is commercially available from Sun Microsystems, Inc.

In an embodiment of the present invention, differences between the standalone version and the client-server version are isolated by a set of interfaces between the client side logic and the server side logic. The set of interfaces can be defined as Java® interfaces. These Java interfaces are implemented by a set of service objects that are part of the server side logic. A corresponding proxy object is defined for each of the service objects. Each of the proxy objects also implements the same Java interfaces for the corresponding service object.

Figure 2:
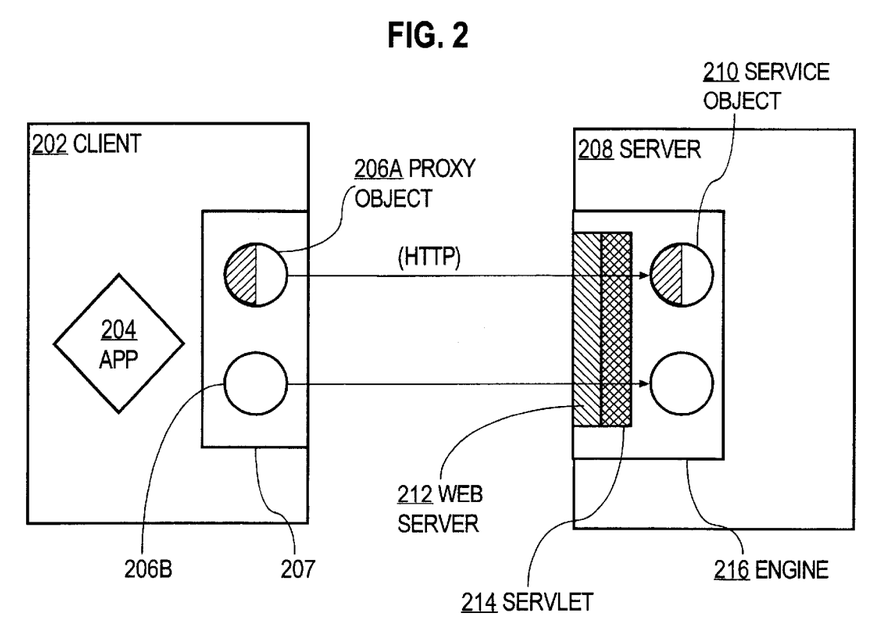
FIG. 2 is a block diagram of a client-server architecture for interface method invocation.

FIG. 2 is a block diagram of an example of an embodiment of this approach. A client 202, which may be a software process, a workstation, personal computer, router or other network device, etc., executes an application 204. One or more proxy objects 206A, 206B are provided as part of a proxy object package 207, which may be implemented in the form of one or more local classes, libraries, etc. There may be any number of proxy objects 206A, 206B, although for clarity and for purposes of illustrating a simple example, two (2) proxy objects 206A, 206B are shown in FIG. 2.

Each proxy object communicates using Hypertext Transfer Protocol (HTTP), or any other protocol that is suitable for network communication of object information, over a network to a server 208, which executes a Web server 212, servlet 214, and engine 216. Generally, Web server 212 provides basic HTTP communication functions; functions of servlet 214 and engine 216 are described below. Server 208 also hosts, in engine 216, one or more service objects 210A, 210B. Each of the service objects implements an interface that is neutral with respect to client and server. That is, the interface implementations are not bound to any code that is specific to client or server, unlike prior Remote Method Invocation approaches. Further, each of the proxy objects 206A, 206B also implements the same interface. Each service object 210A, 210B corresponds to one of the proxy objects 206A, 206B. There may be any number of proxy objects 210A, 210B, although for clarity and for purposes of illustrating a simple example, two (2) proxy objects 210A, 210B are shown in FIG. 2.

Figure 4:
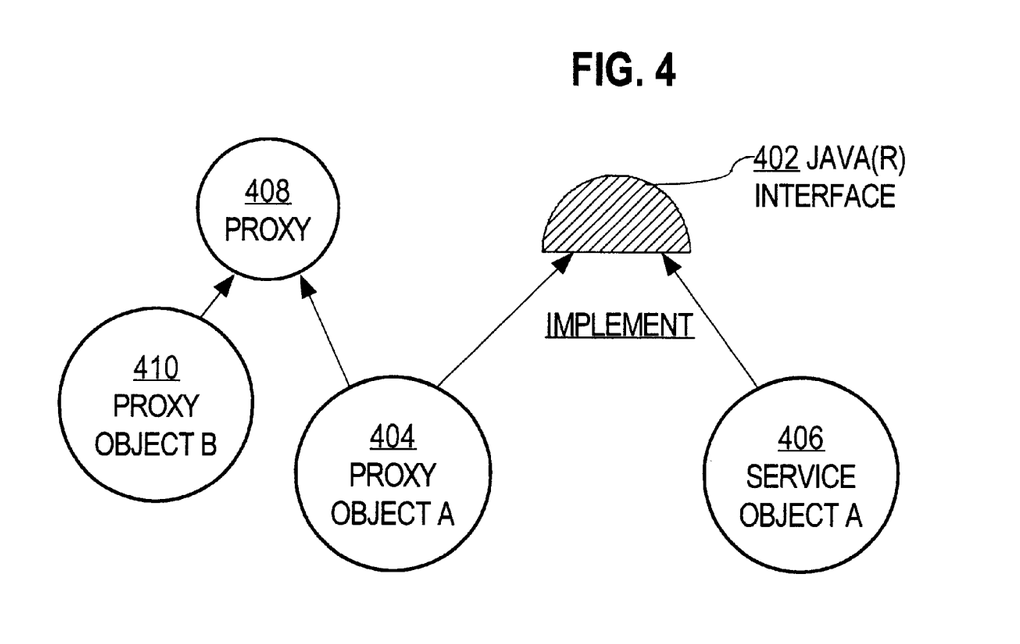
FIG. 4 is a block diagram of an implementation relationship of a plurality of objects.

FIG. 4 is a block diagram illustrating the foregoing relationships. Proxy object A 404 and service object A 406 each implements the same Java® interface 402. Proxy object A 404 also may communicate with another proxy 408. Further, an unrelated proxy object B 410, which does not implement interface 402, also may communicate with proxy 408 in another part of the same program.

In operation, application 204 invokes an interface method that is implemented by one of the proxy objects 206A, 206B. The invoked proxy object, e.g., proxy object 206A, does not itself execute the invoked method. Instead, the invoked proxy object serializes the parameters of the method invocation, and transports the method invocation over the network to Web server 212. Each proxy object implements a transport mechanism sufficient to carry out such transport. Web server 212 receives and passes the invocation to Servlet 214. Servlet 214 receives a method invocation from one of the proxy objects 206A, 206B of client 202. Servlet 214 then identifies one of the service objects 210A, 210B that corresponds to the method invocation. Servlet 214 invokes the corresponding method with the serialized parameters.

When the corresponding method of one of the service objects returns, servlet 214 returns a result object. Result parameters of the result object, which can be a new proxy object, are re-serialized and are passed back to the client side logic.

Although the embodiment illustrated in FIG. 2 depicts servlet 214 and engine 216 as separate elements, they may be implemented in integral fashion.

Figure 3:
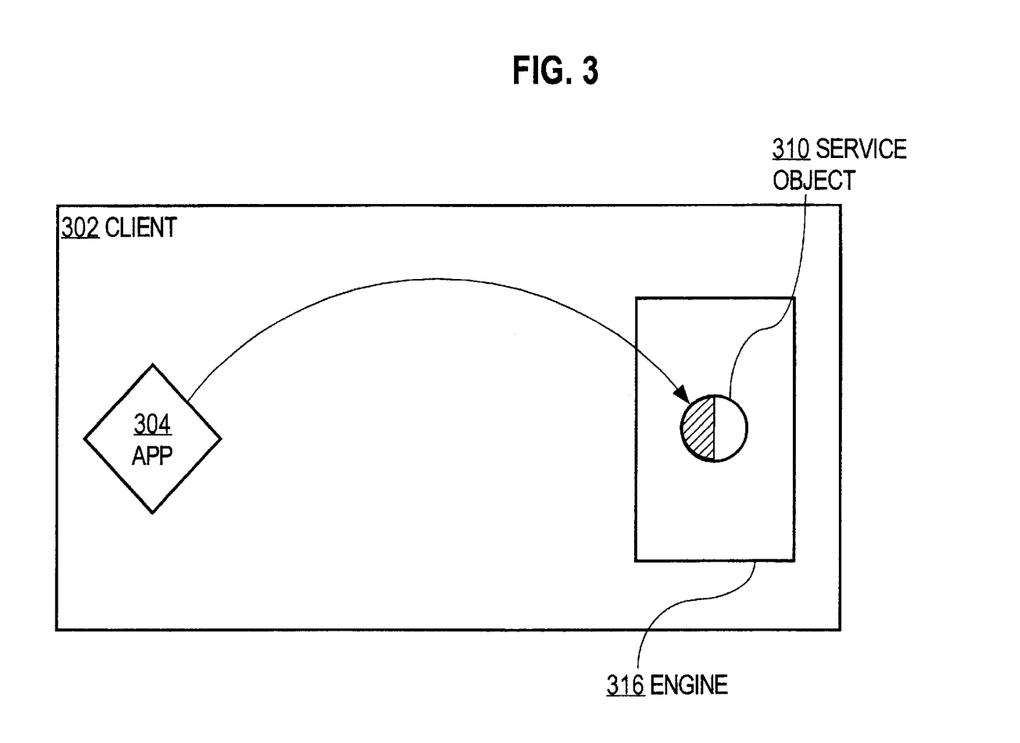
FIG. 3 is a block diagram of a standalone architecture for interface method invocation.

FIG. 3 illustrates a configuration that may be used in a standalone version. In a client 302, application 304 invokes server side logic directly through one or more interfaces that are implemented by one or more service objects 310. Each of the service objects may reside in an engine 316 that may be identical to engine 216 of FIG. 2. When an invoked interface method returns, service object 310 directly returns result values to the application 304. Since the servlet 214 is not executed when in standalone mode, the service objects 310 serve as the result transport mechanism.

Thus, in this configuration, in a stand-alone version, the client side logic invokes the server side logic directly through the Java interfaces, as implemented by the service objects. In the client-server version, the client side logic invokes the server side logic through the same set of Java interfaces. However, the interfaces are implemented by proxy objects. The proxy objects internally implement a transport mechanism to forward the method invocation and parameters to the server side through a servlet API. In response, a servlet identifies the corresponding service object and invokes the corresponding method with serialized parameters. Serialized parameters, as known in this field, are object parameters that are prepared in a binary format that is suitable for communication across a network. When the method returns, the resulting object, which can be a new proxy object, is serialized back into the proxy object for the invocation and from there the result is returned to the client side logic. In the stand-alone version, the client side logic invokes the server side logic directly through the Java interfaces, as implemented by the service objects.

Using this mechanism, the client side logic only interacts with the Java interfaces, without the need to know whether it is dealing with service objects or proxy objects. Accordingly, the client side logic is shielded from any version-specific code. The only exception is the entry point where the application is launched, as described further herein.

Since the server application logic is invoked through the same Java interfaces, the server side application logic is also shielded from any version specific code.

With the client side logic and the server side application logic all shielded from the version specific code through the neutral Java interfaces, it becomes possible to share the same codebase for both the standalone version and the client-server version. All the client-server specific code is isolated in its own files or modules. This makes it possible to compile a specific version without any dependency from the other version based on one common codebase.

Entry Point

When the application starts in standalone version, the program entry point (i.e. the method main( ) for a standalone Java application or the method init( ) for an applet) instantiates the first service object and from there gains access to other service objects. Thus, the first service object is instantiated in initialization code that is platform specific, and thereafter the independent service object code can be used. In the client-server version, the entry point (i.e. the init( ) for an applet) instantiates the first proxy object that corresponds to the first service object in the standalone version, and from there gains access to other proxy objects. To minimize version specific code, compilation condition directives are used in the source code file to implement a specified code segment for each version that defines the entry point logic. Furthermore, to allow both versions to coexist in the same runtime tree, the resulting classes defined in this one file are placed in different Java package path. Accordingly, the application can be invoked in either mode by specifying the entry Java class with different package path. The rest of the supporting classes are then common for both versions with the exception of the proxy objects and the servlet classes. In one embodiment, specified entry classes are created and stored and incorporated in an application program for the purpose of launching the application program in standalone mode or in client-server mode as an applet.

Below is an example of the file that defines an entry point:

```
#ifdef STANDALONE
package com.cisco.nm.cvw.sa;
#else
package com.cisco.nm.cvw.cs;
#endif
...
init( ) {
...
    CvEngineIf __cvEngine;
    CvUserSessionIf __cvUserSession;
#ifdef STANDALONE
    __cvEngine = new
        com.cisco.nm.cvw.guiservice.CvEngine( );
#else
    __cvEngine = new
        com.cisco.nm.cvw.guiservice.CvEngineProxy( );
#endif
    __cvUserSession = __cvEngine.login( );
...
}
```

This approach offers several significant advantages over conventional remote method invocation. First, RMI interfaces are required to extend from the java.rmi.Remote interface. However, this requirement defeats the purpose of having neutral interfaces between the client-side logic and the server-side logic so that version specific code can be isolated in its own files or modules. Second, RMI remote objects are required to extend from the class java.rmi.server.UnicastRemoteObject class. This requires the service objects in the server side logic to extend from the UnicastRemoteObject class. As a result, version specific code is introduced in the server side logic and makes it difficult to share the same codebase for both versions.

Furthermore, with client-server specific code introduced in the Java interfaces and in the server side logic, this create dependencies between the standalone version and the client-server version during compilation time. For example, compiling for standalone mode requires references to client-server specific classes.

Based on these drawbacks, RMI approach cannot be used for the purpose of deriving a single codebase to support multi-mode environment. In contrast, according to an embodiment, with the help of the Java interfaces and proxy objects, version specific code can be isolated in its own files and modules. The only exception is the file that defines the entry point. In this case, compilation condition directives are used to place the resulting entry class in different Java package path. This eliminates the dependency between the two versions at compilation time.

Common client side logic and server side logic are all shielded from the version specific code through the neutral Java interfaces. This allows the use of a single codebase to support both the standalone version and the client-server version. This approach also minimizes the version specific code and maximizes the sharing of common logic. Accordingly, this approach reduces development and the maintenance cost.

With the help of compilation condition directive, different version of the entry class can be placed in different Java package path. This allows the same codebase for both version to coexist in the same runtime tree.

By using proxy objects, the underlying transport protocol are hidden from both the client side logic and the server side logic. This simplifies the implementation of the common logic for both versions.

Overview of a Second Embodiment

According to another embodiment, the foregoing general configuration is specifically implemented in a management engine is provided for use in a network management software application. The management engine provides an interface between a graphical user interface and one or more managed devices of a computer network. In general, functions of the management engine include: identifying a device description of a managed device and discovering its components; interfacing to a device description to perform device-specific logical functions and to create and store a containment tree representing hardware elements contained in the device; providing support to the GUI to create GUI screens and to perform device management operations; perform retrieval and modification of configuration information that is stored by the managed devices.

The network management application is expected to support a large number of different network device types. Therefore, program functions that are common to more than one device type may be implemented as an engine. All device-specific information is defined in a set of one or more device descriptions. The engine drives the network management application for each of the device types based on the device descriptions.

In this embodiment, the same single computer program source code base implements the foregoing functions for both client-server and standalone modes. A Client Abstraction Layer hides differences between client-server mode and standalone mode.

Figure 5:
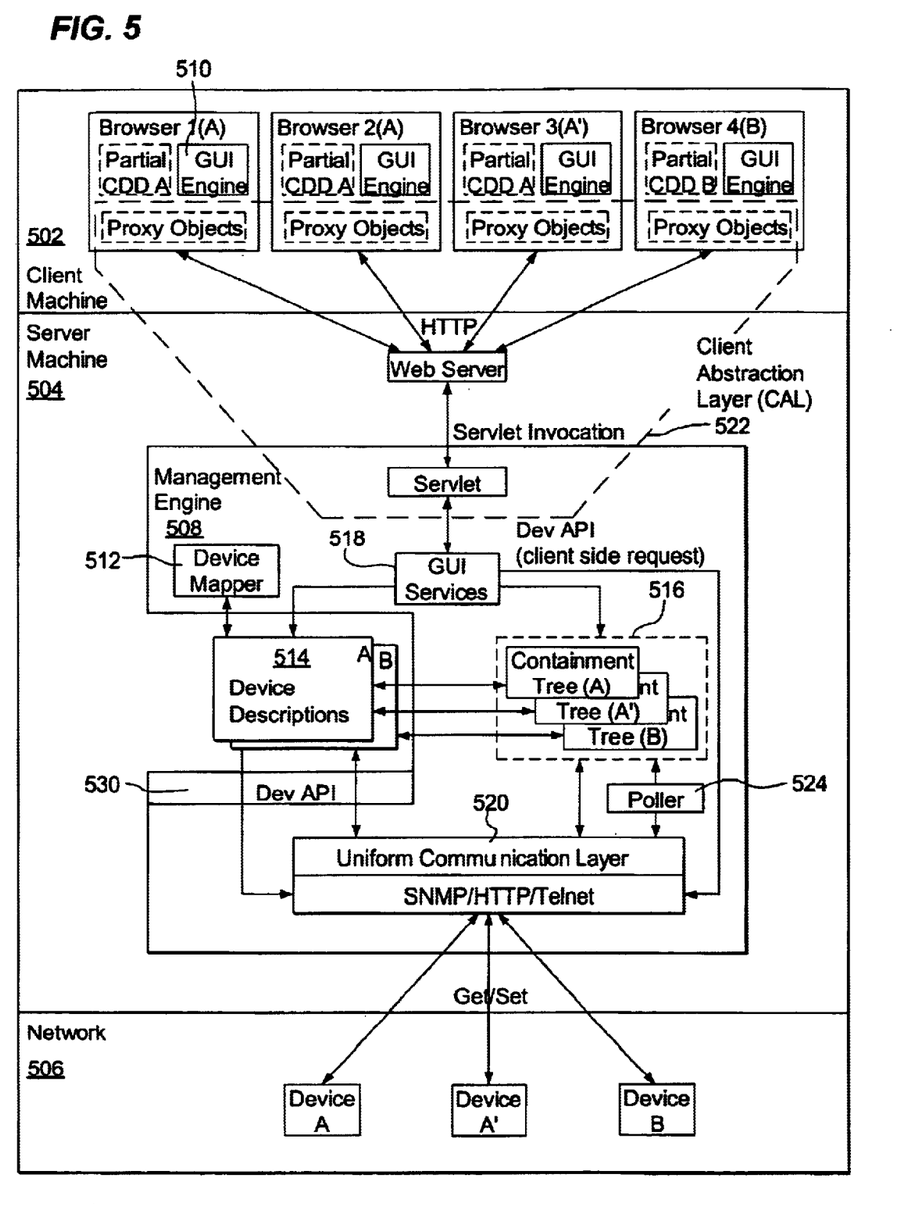
FIG. 5 is a block diagram illustrating a simplified, high level view of an architecture of a management engine in client-server mode.

FIG. 5 is a block diagram illustrating a simplified, high level view of an architecture of a management engine in client-server mode. In general, client machine 502 communicates over a network using HTTP to a server machine 504, which in turn communicates through network 506 to network devices under management such as Device A, Device A', and Device B. In the example of FIG. 5, four (4) users are using client machine 502, as indicated by Browser 1, Browser 2, Browser 3, and Browser 4, each of which is associated with a user. The users are using client machine 502 to manage three (3) devices A, A', B in client-server mode. User 1 and User 2 both are managing device A. User 3 is managing device A', which is the same type of device as device A. User 4 is managing device B. All the users logically send commands through management engine 508 of server machine 504 to manage the devices.

Figure 6:
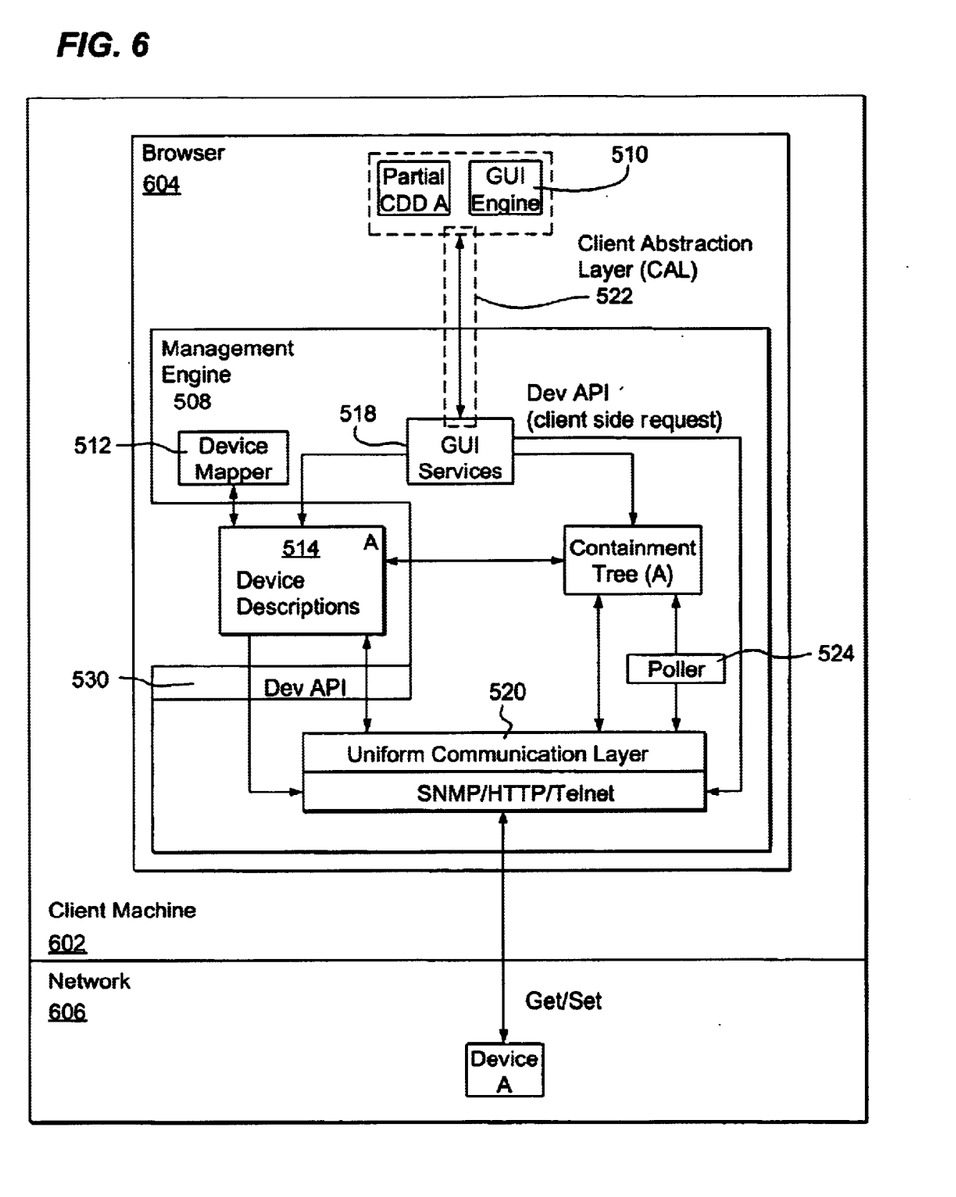
FIG. 6 is a block diagram of illustrating a simplified, high-level view of an architecture of a management engine in standalone mode.

FIG. 6 is a block diagram of illustrating a simplified, high-level view of an architecture of a management engine in standalone mode. In this example, one user of client machine 602 manages one device at a time. Management engine 508 may be co-located with GUI engine 510 in the same browser in the form of one applet.

In operation, a user specifies a device to manage. Device mapper 512 identifies the device description for the device, from among one or more stored device descriptions 514, and then discovers components of the device. During the discovery process, a chassis view containment tree 516 is created and stored in memory to represent the components of the device. When the discovery process is complete, the complete containment tree 516 is transferred to GUI engine 510, which presents a display of a view of the device chassis ("chassis view screen") to the user in a browser window. Each GUI engine 510 can then request, from the containment tree 516, one or more GUI definitions of a configuration dialog and a monitor dialog, as the user navigates to a dialog screen from a chassis view screen. A corresponding dialog tree is constructed and transferred to GUI engine 510.

GUI services 518 interact with the corresponding containment tree or dialog tree to request refreshing the values in the tree from the device or to request applying the values in the tree to the device. The nodes in the containment tree or dialog tree, in turn, interact with a Uniform Communication Layer 520 to perform retrieval of information from a device or modification of information in a device. In the case of a retrieval request, new data is refreshed in the containment tree or dialog tree, and the device descriptions 514 are invoked to re-evaluate the new data. GUI service 518 retrieves such newly evaluated data and passes it to GUI engine 510. For a modification request, the data in the dialog tree is applied to the device and the GUI service 518 returns an operation status value to the GUI engine 510.

Communications between GUI engine 510 and management engine 508 are performed through Client Abstraction Layer 522. In client-server mode, Client Abstraction Layer 522 uses servlet invocation as a communication mechanism. In standalone mode, Client Abstraction Layer 522 uses direct method invocation.

Device mapper 512 is used to identify which device description 514 to use for the managed device during device discovery. A value of a MIB variable such as "sysObjectId" may be used as an index or lookup value for this purpose. The criteria that determines which sysObjectId value maps to which device description 514 may be use determined by a developer and stored in an abstract device description of the type disclosed in co-pending U.S. patent application Ser. No. 09/334,766, filed Jun. 16, 1999, entitled "Network Management Using Abstract Device Descriptions," and naming Maximilian J. Spring as inventor. Such criteria may be extended for additional or different devices. Once the corresponding device description 514 is identified, one or more device-specific classes may be instantiated, based on the device description 514, to represent the device.

Containment tree 516 is a representation of the containment hierarchy for the components in the device, and a dialog tree is a representation of the elements in a configuration dialog or a monitor dialog. There may be more than one containment tree 516. For example, a chassis view containment tree may serve as a starting point for the user to navigate to different parts of the network management application, and therefore may serve as a starting point for instantiating most of the data structures and class instances that are used to represent the real-time device model for the managed device.

The chassis view containment tree 516 is constructed as part of the device discovery process. Each node of the tree may have references to the following, as appropriate: static GUI definitions for the components in the chassis view; specific logic to produce the component state in the chassis view; navigation information for the component if it is selected in the chassis view; references to the corresponding configuration and monitor dialog tree for the component (the instantiation of the configuration and monitor dialog tree are performed on request by the GUI engine); references to one or more shadow objects in the Uniform Communication Layer for setting and retrieving information for the corresponding component in the managed device. Shadow objects are described in detail in the Spring application identified above.

Containment trees 516 are used by GUI services 518 to support requests from GUI engine 510. When a client requests to manage ("opens") a device, a containment tree is created and stored to represent the device. All subsequent requests to open the same device by other clients use the same containment tree. As a result, unnecessary SNMP message traffic for discovering the device is avoided, and response time for opening the device for subsequent clients is greatly reduced.

Dialog trees are used to support the configuration and monitoring dialogs that are presented to the user. Upon receiving a request to modify a dialog tree, GUI services 518 updates the changes to the dialog tree, which interfaces with Uniform Communication Layer 520 to apply changes to the device.

Device descriptions 514 consists of one or more base classes and one or more device specific classes. The base classes provide a generic device package interface to the management engine. Accordingly, the management engine may interact with the device package through the base classes, without having to interact with device-specific interfaces. Further disclosure concerning the device descriptions 514 is set forth in the Spring application referenced above.

Uniform Communication Layer 520 provides an interface to protocol-specific details involved in retrieving and modifying device information. For example, the source of information on a GUI screen may derive from values obtained using SNMP, Telnet, or HTTP protocols, and therefore retrieval and modification of device information in such different protocols is facilitated by a uniform application programming interface in the form of Uniform Communication Layer 520. For SNMP, for example, Uniform Communication Layer 520 may support MIB table walk, Get-Next and Get-Bulk operations.

GUI services 518 assists GUI engine 510 by providing a dynamic GUI representation of the managed device. The functions of GUI services 518 may include discovering a user-specified device; retrieving the containment hierarchy of the device components and the chassis component definitions to support the construction of a chassis view; retrieving up-to-date status for each of the components in the containment hierarchy; retrieving definitions for the configuration dialogs and the monitor dialogs; and modifying device parameters from the configuration dialog.

Client Abstraction Layer 522 provides a uniform, object-based interface of GUI services 518 to GUI engine 510. Client Abstraction Layer 522 hides the different implementations for supporting communications between the GUI engine 510 and the GUI services 518 in both standalone and client-server modes.

In client-server mode, communication is implemented as one or more servlet invocations through HTTP. A set of proxy objects is defined in which the proxy objects have the same interfaces as the actual objects in GUI services 518 to provide the same service APIs to the GUI engine 510 on the client side. Accordingly, a GUI engine 510 does not need to be aware of the servlet interfaces. The proxy objects implement the servlet interfaces internally. Upon receiving the servlet invocation from the proxy objects on the client side, the servlet invokes the corresponding service API in GUI services 518 and returns the result back to the proxy objects.

In standalone mode, communication is implemented as direct method invocations. The GUI engine 510 invokes the service APIs directly through the objects that are provided by GUI services 518.

Poller 524 handles routine polling of a managed device for status updates on the chassis view. This is done by keeping track of the polling interval for each polling group that is associated with a containment tree. Whenever a polling interval expires, it informs the Uniform Communication Layer 520 to refresh the polling group, triggers evaluation of the containment tree, and stores the status changes in the memory. The status changes are provided to the GUI engine 510 upon request. GUI engine 510 may request such status changes whenever the polling interval expires on the client side.

Using this centralized poller approach, management engine 508 can support multiple polling groups within a containment tree as well as sharing the same containment tree with multiple clients. In the latter case, the poller aligns the different polling intervals for the clients according to the discrete interval setting and only polls a device based on the shortest polling interval.

A developer API 530 is provided to enable a device package software developer to perform custom operations in the event that the foregoing functions are not sufficient for a particular task. For example, a developer may wish to implement custom operations to carry out re-discovery of devices in response to detection of a hot swap of components of the device; to carry out custom SET operations; to set up custom menu options; or to set up custom GUI widgets. In one embodiment, management engine 508 provides APIs to implement the following functions: trigger to re-discover a device in response to a hot swap; SNMP operations including GET, GETNEXT, WALK, GETBULK, and SET; MIB services; and access to device context information to manipulate SNMP session parameters.

Hardware Overview

Figure 7:
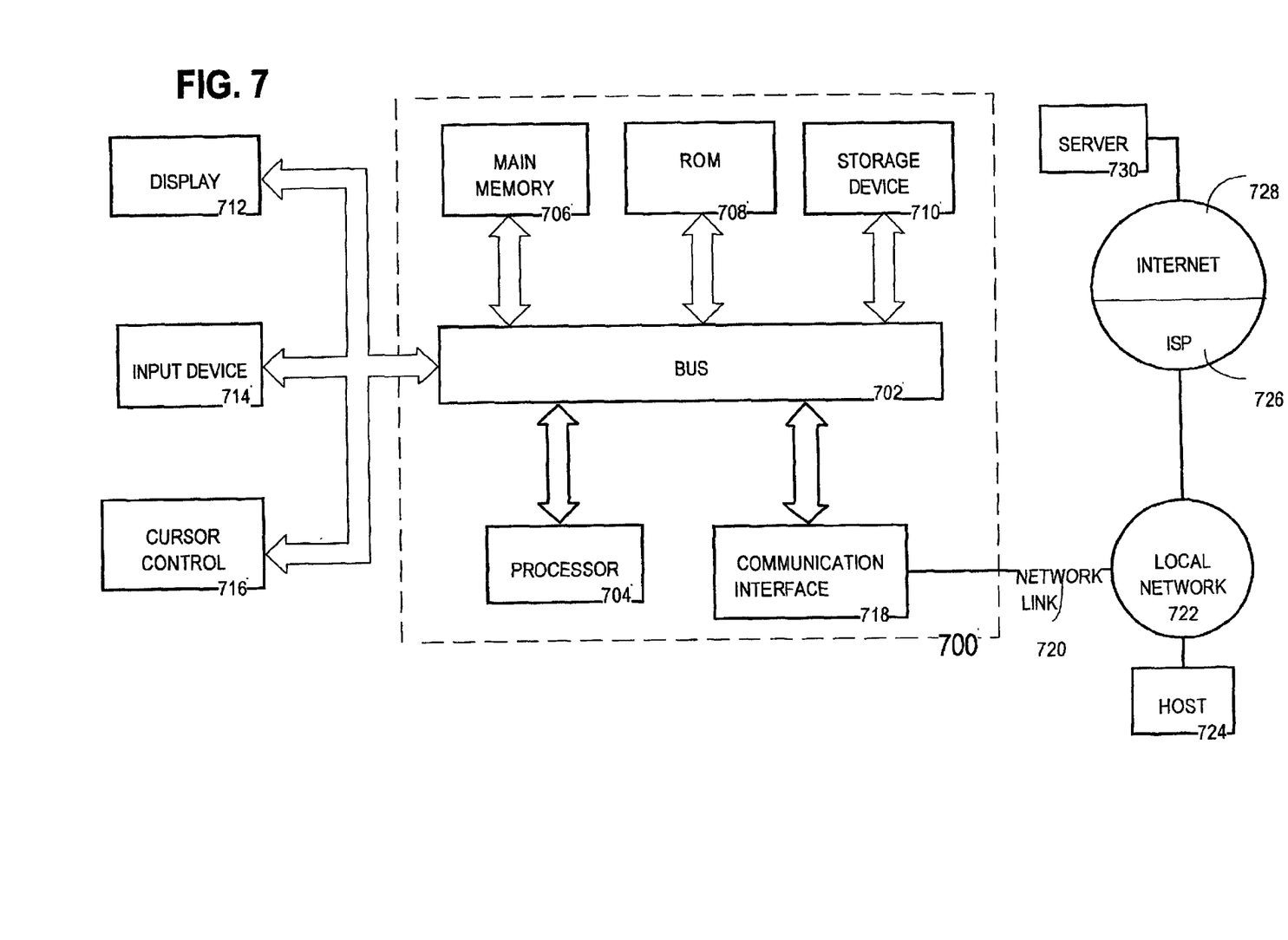
FIG. 7 is a block diagram of a computer system hardware arrangement with which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for using a single computer program code base to provide a program that is operable in either a client-server mode or a standalone mode. According to one embodiment of the invention, using a single computer program code base to provide a program that is operable in either a client-server mode or a standalone mode is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for using a single computer program code base to implement a multi-mode computing environment as described herein.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method as of operating a software application in either a client-server mode or a standalone mode using one software code base, comprising the computer-implemented steps of:

creating and storing a client logic and a server logic within the one software code base;

creating one or more service objects that implement one or more interfaces among the client logic and the server logic;

creating and storing a proxy object corresponding to each of the one or more service objects;

creating and storing a standalone version of the software application that includes the one or more service objects, in which the client logic invokes the server logic through the interfaces, which are implemented by the one or more service objects; and creating and storing a client-server version of the software application that includes the one or more service objects and the proxy objects, in which the client logic invokes the server logic through the interfaces, which are implemented by the one or more proxy objects.

2. A method as recited in claim 1, further comprising the steps of:

receiving an invocation of a server logic method from the client logic at one of the proxy objects;

forwarding the method invocation to a servlet element;

identifying and invoking a corresponding method of one of the one or more service objects that corresponds to one of the proxy objects.

3. A method as recited in claim 2, further comprising the steps of serializing parameters of the invocation of the server logic as part of invoking the corresponding method.

4. A method as recited in claim 2, further comprising the steps of:

receiving a result of the service object invocation in the form of a second proxy object;

serializing result parameters of the second proxy object into the first proxy object;

returning results to the client logic via the proxy object.

5. A method as recited in claim 2, further comprising the steps of:

receiving a result of the service object invocation in the form of a general Java® object;

serializing result parameters of the second proxy object into the first proxy object;

returning results to the client logic via the proxy object.

6. A method as recited in claim 1, wherein the interfaces are defined as Java® interfaces that are neutral with respect to the client-server mode and the standalone mode.

7. A method as recited in claim 1, wherein the standalone version and the client-server version are functionally different versions.

8. A method as recited in claim 1, further comprising the steps of compiling the standalone version to result in creating and storing a standalone executable that uses the same one software code base as the client-server version but that has no dependency on the client-server version.

9. A method as recited in claim 8, further comprising the steps of compiling the client-server version to result in creating and storing a client-server executable that uses the same one software code base as the standalone version but that has no dependency on the standalone version.

10. A method as recited in claim 1, further comprising the steps of:

during execution of the standalone version, initiating a first service object;

gaining access to all other service objects through the first service object.

11. A method as recited in claim 2, further comprising the steps of:

during execution of the client-server version, instantiating a first proxy object that corresponds to a first service object of the standalone version;

gaining access to all other proxy objects through the first proxy object.

12. A method of supporting operation of a software application in either a client-server mode or a standalone mode in the same runtime environment using one software code base, comprising the computer-implemented steps of:

creating and storing a client logic and a server logic within the one software code base;

creating one or more service objects that implement one or more interfaces among the client logic and the server logic;

creating and storing a proxy object corresponding to each of the one or more service objects;

creating and storing a standalone version of the software application that includes the one or more service objects, in which the client logic invokes the server logic through the interfaces, which are implemented by the one or more service objects;

creating and storing a client-server version of the software application that includes the one or more service objects and the proxy objects, in which the client logic invokes the server logic through the interfaces, which are implemented by the one or more proxy objects.

13. An apparatus for operating a software application in either a client-server mode or a standalone mode using one software code base, comprising:

means for creating and storing a client logic and a server logic within the one software code base;

means for creating one or more service objects that implement one or more interfaces among the client logic and the server logic;

means for creating and storing a proxy object corresponding to each of the one or more service objects;

means for creating and storing a standalone version of the software application that includes the one or more service objects, in which the client logic invokes the server logic through the interfaces, which are implemented by the one or more service objects; and means for creating and storing a client-server version of the software application that includes the one or more service objects and the proxy objects, in which the client logic invokes the server logic through the interfaces, which are implemented by the one or more proxy objects.

14. An apparatus for operating a software application in either a client-server mode or a standalone mode using one software code base, comprising:

a processor;

one or more stored sequences of instructions that are accessible to the processor and which, when executed by the processor, cause the processor to carry out the steps of:

creating and storing a client logic and a server logic within the one software code base;

creating one or more service objects that implement one or more interfaces among the client logic and the server logic;

creating and storing a proxy object corresponding to each of the one or more service objects;

creating and storing a standalone version of the software application that includes the one or more service objects, in which the client logic invokes the server logic through the interfaces, which are implemented by the one or more service objects; and creating and storing a client-server version of the software application that includes the one or more service objects and the proxy objects, in which the client logic invokes the server logic through the interfaces, which are implemented by the one or more proxy objects.

15. A computer-readable medium carrying a software program that is operable in either a client-server mode or a standalone mode using one software source code base, comprising:

a server logic element derived from the one software code base that includes one or more service objects that implement one or more interfaces;

a client logic element derived from the one software code base that includes one or more proxy objects, each of the proxy objects corresponding to one of the one or more service objects, each of the proxy objects implementing the interfaces, wherein the client logic element is communicatively coupled to the server logic element by a network;

one or more sequences of program instructions in the client logic element for a standalone version of the software program which, when executed by one or more processors, cause the one or more processors to invoke the server logic through the interfaces that are implemented by the one or more service objects; and one or more sequences of program instructions in the client logic element for a client-server version of the software program which, when executed by one or more processors, cause the one or more processors to invoke the server logic through the interfaces that are implemented by the one or more proxy objects.

16. A computer-readable medium as recited in claim 15, wherein each of the proxy objects further comprise a transport mechanism that can receive an invocation of a method that implements one of the interfaces, serialize parameters associated with the invocation, and forward the invocation to a corresponding service object of the server logic element.

17. A computer-readable medium carrying one or more sequences of instructions for operating a software application in either a client-server mode or a standalone mode using one software code base, wherein execution of the one or more sequences of instructions by one or more processors causes the one or more processors to perform the steps of:

creating and storing a client logic and a server logic within the one software code base;

creating one or more service objects that implement one or more interfaces among the client logic and the server logic;

creating and storing a proxy object corresponding to each of the one or more service objects;

creating and storing a standalone version of the software application that includes the one or more service objects, in which the client logic invokes the server logic through the interfaces, which are implemented by the one or more service objects; and of creating and storing a client-server version of the software application that includes the one or more service objects and the proxy objects, in which the client logic invokes the server logic through the interfaces, which are implemented by the one or more proxy objects.

18. A computer-readable medium as recited in claim 17, wherein the sequences of instructions further comprise instructions for carrying out the steps of:

receiving an invocation of a server logic method from the client logic at one of the proxy objects;

forwarding the method invocation to a servlet element;

identifying and invoking a corresponding method of one of the one or more service objects that corresponds to one of the proxy objects.

19. A method of operating a software application in either a client-server mode or a standalone mode using one software code base, comprising the computer-implemented steps of:

creating and storing a client logic and a server logic within the one software code base;

creating one or more service objects that implement one or more interfaces that are neutral with respect to the client-server mode and the standalone mode among the client logic and the server logic;

creating and storing a proxy object corresponding to each of the one or more service objects;

creating and storing a standalone version of the software application that includes the one or more service objects, in which the client logic invokes the server logic through the interfaces, which are implemented by the one or more service objects; and creating and storing a client-server version of the software application that includes the one or more service objects and the proxy objects, in which the client logic invokes the server logic through the interfaces, which are implemented by the one or more proxy objects.

* * * * *

UNITED STATES PATENT AND TRADEMARK OFFICE
CERTIFICATE OF CORRECTION

PATENT NO. : 6,769,123 B1
DATED : July 27, 2004
INVENTOR(S) : Chan, Chi-Choi

It is certified that error appears in the above-identified patent and that said Letters Patent is hereby corrected as shown below:

Column 12,
Line 64, "method as of operating" should read -- method of operating --;

Column 14,
Line 1, "recited in claim 2" should read -- recited in claim 3 --;

Column 16,
Line 11, "of creating and storing" should read -- creating and storing --.

Signed and Sealed this

Thirtieth Day of November, 2004

JON W. DUDAS
*Director of the United States Patent and Trademark Office*